United States Patent
Crum et al.

(10) Patent No.: US 11,667,480 B2
(45) Date of Patent: Jun. 6, 2023

(54) SYSTEMS AND METHODS OF APPLYING REVERSIBLE ADHESION IN A TRANSPORTATION SYSTEM

(71) Applicant: Rockwell Automation Technologies, Inc., Mayfield Heights, OH (US)

(72) Inventors: Kyle A. Crum, Bayside, WI (US);
Robert H. Schmidt, Mequon, WI (US);
David A. Vasko, Hartland, WI (US);
Neil R. Bentley, Boston, MA (US);
Tracy M. Clark, Boston, MA (US);
Michael D. Cook, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/350,682

(22) Filed: Jun. 17, 2021

(65) Prior Publication Data
US 2021/0403252 A1 Dec. 30, 2021

Related U.S. Application Data

(60) Provisional application No. 63/043,216, filed on Jun. 24, 2020.

(51) Int. Cl.
*B65G 47/90* (2006.01)
*B65G 47/38* (2006.01)
(Continued)

(52) U.S. Cl.
CPC ............ *B65G 47/90* (2013.01); *B25J 9/0093* (2013.01); *B61C 13/04* (2013.01); *B65G 35/08* (2013.01);
(Continued)

(58) Field of Classification Search
None
See application file for complete search history.

(56) References Cited

U.S. PATENT DOCUMENTS 7,845,483 B2 * 12/2010 Noguchi ............... B23Q 7/007
198/346.3
8,337,656 B2 12/2012 Nishio
(Continued)

FOREIGN PATENT DOCUMENTS

DE 102010042753 A1 4/2012
DE 102011054701 A1 4/2013
(Continued)

OTHER PUBLICATIONS

European Patent Office, "Communication pursuant to Rule 62 EPC, Extended European Search Report", application No. 21181515.4 EPO, dated Nov. 15, 2021, 7 pages.
(Continued)

*Primary Examiner* — Kavel Singh
(74) *Attorney, Agent, or Firm* — Lippes Mathias LLP

(57) ABSTRACT

An industrial transportation system includes one or more movers and a robot system. The robot system is configured to load one or more items on the surface of respective movers and unload the one or more items from the surface of respective movers. Each of the one or more movers includes a first surface configured to provide reversible adhesion between the mover and an item loaded on the mover. The reversible adhesion of the surface is activated at loading and deactivated at unloading.

9 Claims, 7 Drawing Sheets

(51) Int. Cl.
  *B65G 35/08*   (2006.01)
  *B65G 54/02*   (2006.01)
  *B25J 9/00*    (2006.01)
  *B61C 13/04*   (2006.01)

(52) U.S. Cl.
  CPC ...... *B65G 47/38* (2013.01); *B65G 2203/0266* (2013.01); *B65G 2207/02* (2013.01)

(56) References Cited

U.S. PATENT DOCUMENTS

| | | | |
|---|---|---|---|
| 9,162,820 B2 * | 10/2015 | Hanisch | B65G 15/42 |
| 9,574,113 B2 | 2/2017 | Crosby | |
| 9,603,419 B2 | 3/2017 | Crosby | |
| 10,144,195 B2 | 12/2018 | Crosby | |
| 10,150,892 B2 | 12/2018 | Crosby | |
| 10,259,975 B2 | 4/2019 | Pesika | |
| 10,773,847 B2 * | 9/2020 | Bellante | B65B 57/08 |
| 11,065,771 B2 * | 7/2021 | Shintake | H02N 13/00 |
| 2004/0262127 A1 | 12/2004 | Harnish | |
| 2007/0013642 A1 * | 1/2007 | Yoon | H01L 21/67736 |
| | | | 345/100 |
| 2018/0243784 A1 | 8/2018 | Schultz | |
| 2018/0282069 A1 | 10/2018 | Frumkin | |
| 2020/0299551 A1 | 9/2020 | Sitti | |

FOREIGN PATENT DOCUMENTS

| | | |
|---|---|---|
| EP | 1318080 B1 | 6/2005 |
| EP | 2844590 B1 | 9/2016 |
| WO | 2007121450 A2 | 10/2007 |
| WO | 2015113614 A1 | 8/2015 |

OTHER PUBLICATIONS

European Patent Office, "Communication pursuant to Rule 64 EPC, Partial European Search Report", application No. 21181474.4 EPO, dated Nov. 23, 2021, 12 pages.

European Patent Office, "Communication pursuant to Rule 62 EPC, Extended European Search Report", application No. 21181474.4 EPO, dated Feb. 4, 2022, 11 pages.

"Controllable load sharing for soft adhesive interfaces on three-dimensional surfaces"; Sukho Songa,b, Dirk-Michael Drotlefa, Carmel Majidib, and Metin Sitti; Physical Intelligence Department, Max Planck Institute for Intelligent Systems Stuttgart, Germany; and Department of Mechanical Engineering & Robotics Institute, Carnegie Mellon University, E4344-E4353; PNAS; Published on May 15, 2017.

* cited by examiner

SYSTEMS AND METHODS OF APPLYING REVERSIBLE ADHESION IN A TRANSPORTATION SYSTEM

CROSS-REFERENCE TO RELATED APPLICATION

This application claims priority to, U.S. Provisional Patent Application No. 63/043,216, filed on Jun. 24, 2020, and entitled "SYSTEMS AND METHODS FOR USING REVERSIBLE ADHESIVES IN INDUSTRIAL AUTOMATION." The entirety of the related patent application is incorporated herein by reference.

FIELD OF THE DISCLOSURE

The present disclosure relates to systems and methods of applying reversible adhesion in a transportation system.

BACKGROUND OF THE DISCLOSURE

Reversible adhesion, as a repeatable, robust, and power efficient mode of adhesion, has aroused extensive research interest. The Gecko-like material enables high load bearing, easy adhering, and easy releasing. These adhesives can be advantageously used in industrial automation systems for providing reversible adhesion in various scales.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the features, which illustrate the exemplary embodiments in detail, it should be understood that the application is not limited to the details or methodology set forth in the description or illustrated in the figures. It should also be understood that the terminology is for the purpose of description only and should not be regarded as limiting.

Some embodiments of the present invention relate to an industrial transportation system that includes one or more movers and a robot system. The robot system is configured to load one or more items on the surface of respective movers and unload the one or more items from the surface of respective movers. Each of the one or more movers includes a first surface configured to provide reversible adhesion between the mover and an item loaded on the mover. The reversible adhesion of the surface is activated at loading and deactivated at unloading.

Some embodiments of the present invention relate to an industrial motion system that includes one or more movers configured to transport items, each mover including a surface configured to provide reversible adhesion. The reversible adhesion of the surface is activated when an item is loaded on the surface of a respective mover and the reversible adhesion of the surface is deactivated when the item is unloaded from the surface of the respective mover.

Figure 1:
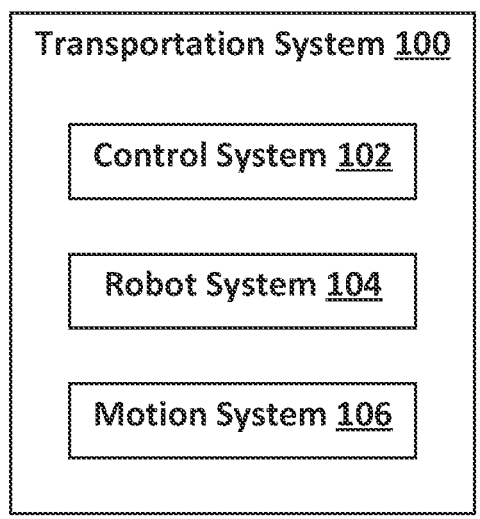
FIG. 1 shows a block diagram of a transportation system 100 according to an illustrative embodiment.

With reference to FIG. 1, a block diagram of a transportation system 100 is shown according to an illustrative embodiment. The transportation system 100 may be used to transport various components in an industrial automation environment. For example, the transportation system 100 can be used in a consumer packaged goods (CPG) system. The transportation system 100 includes a control system 102, a robot system 104, and a motion system 106. The robot system 104 is configured to load and/or unload items to/from the motion system 106. The motion system 106 includes one or more movers. For example, the robot system 104 may include a robot arm to place items on or remove items from one or more movers of the motion system 106.

In some embodiments, the one or more movers may be industrial mobile robotic movers including, but are not limited to, autonomous guided robots (AGR) configured to move in fixed paths and autonomous mobile robots (AMR) configured to navigate their own paths. In some embodiments, the one or more movers may be driven by a linear motor and movably mounted on a track for moving along a path. In some embodiments, the one or more movers may include a combination of different types of movers. In some embodiments, each of the one or more movers include at least one adhesive surface that can provide reversible adhesion. In some embodiments, each of the one or more movers has at least one surface to which a reversible adhesive component is attached. The reversible adhesive component can provide reversible adhesion, such as the reversible adhesive apparatus described in U.S. patent application Ser. No. 17/350,455, "REVERSIBLE ADHESIVE APPARATUS," filed on Jun. 17, 2021, the content of which is hereby incorporated by reference in its entirety. For example, each mover has a reversible adhesive component attached on the top surface of the mover to receive an item.

In some embodiments, each of the one or more movers may include an actuator configured to activate and/or deactivate reversible adhesion on the mover. In some embodiments, the reversible adhesion is activated in response to a first shear force being generated between the contacting surfaces of the mover and the item. In some embodiments, the reversible adhesion is deactivated in response to a second shear force being generated between the contacting surfaces of the mover and the item. The actuator may include any suitable mechanical or electrical actuators. For example, a mechanical lever may push the item while the item is being loaded on the mover such that a shear force between the item and the mover is created to activate adhesion between the item and the mover. As another example, an electrical actuator may be configured to generate a shear force between the item and the mover while the item is being loaded on the mover such that the generated shear force activates adhesion of the mover.

In some embodiments, the control system 102 is configured to control the robot system 104 and the motion system 106. For example, the control system 102 may send control signals to the robot system 104 and instruct the robot system 104 to generate a desired movement (e.g., a movement that generates a shear force between an item and a mover) and conduct a desired action (e.g., load or unload an item to or from a mover). The control system 102 may send control signals to the motion system 106 to control one or more parameters of the one or more movers, such as position, velocity, acceleration, jerk, force, current, etc. In some embodiments, each of the one or more movers is controlled independently.

The control system 102 is configured to generate control signals to activate and/or deactivate adhesion between items and the one or more movers by controlling at least one of the robot system 104 and the motion system 106. The control system 102 is configured to control activation and deactivation of the reversible adhesion at any desired time and/or in any desire mover position.

For example, in some embodiments, the control system 102 sends first control signals to the robot system 104 to load the item in a way such that loading action can generate a first shear force between the item and the mover to activate adhesion between the item and the mover. In some embodiments, the control system 102 sends second control signals to the robot system 104 to unload the item in a way such that the unloading action can generate a second shear force between the item and mover to deactivate adhesion between the item and the mover.

In some embodiments, the control system 102 sends first control signals to the motion system 106 to generate, while an item is being loaded to the mover, a first shear force between the item and the mover to activate adhesion. In some embodiments, the control system 102 sends second control signals to the motion system 106 to generate, while the item is being unloaded from the mover, a second shear force between the item and mover to deactivate adhesion. In some embodiments, the first and second control signals may change any suitable parameters (e.g., position, velocity, acceleration, etc.) of the mover such that first and second shear force may be generated.

In some embodiments, the control system 102 sends first control signals to at least one of the robot system 104 and the motion system 106 to activate adhesion and sends second control signals to at least one of the robot system 104 and the motion system 106 to deactivate adhesion. For example, the control system 102 may instruct, through the first control signals while loading an item, the robot system 104 to generate a first shear force between the item and the mover to activate adhesion and instruct, through the second control signals while unloading the item, the motion system 106 to generate a second shear force between item and the mover to deactivate adhesion.

In some embodiments, at least one of the one or more movers includes a side surface configured to provide reversible adhesion such that upon activation, the mover can be adhered to an adjacent mover to form a joined mover in order to transport big item or enable long distance transportation. Movers of the joined mover, upon deactivation of adhesion, are disconnected and move independently. The adhesion on the side surfaces of the movers is activated by a first shear force generated between two adjacent movers. The first shear force between two adjacent movers may be generated by any suitable means such as providing relative motions between the two movers. The adhesion on the side surface of the movers is deactivated by a second shear force generated between the two adjacent movers. The second shear force between two adhered movers may be generated by any suitable means such providing relative motions between the two movers.

Figure 2A:
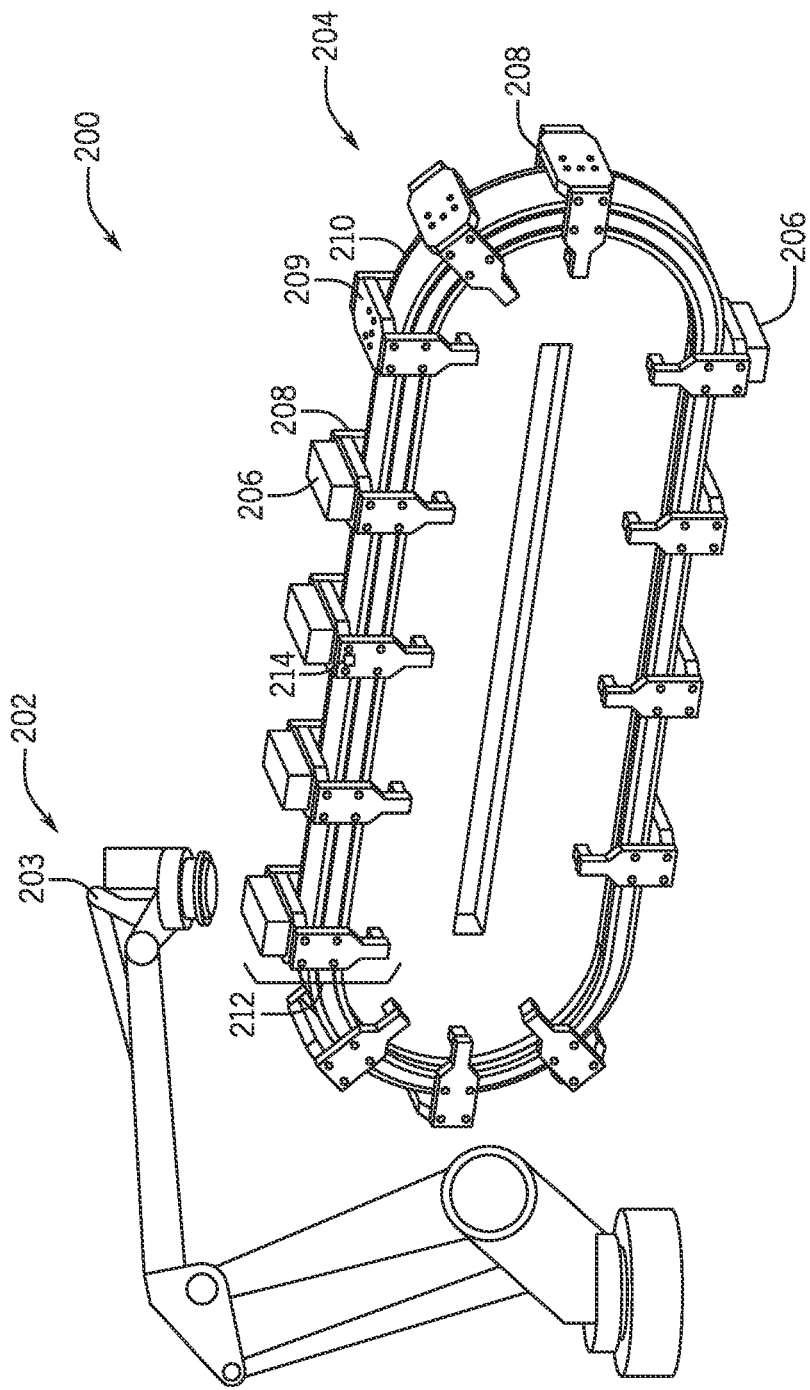
FIG. 2A shows a track transportation system 200 according to an illustrative embodiment.

FIG. 2A shows a transportation system 200 according to an illustrative embodiment. The transportation system 200 may be used to transport various components (e.g., items 206) in an industrial automation environment. For example, the transportation system 200 can be used in a consumer packaged goods system. The transportation system 200 includes a robot system 202 and a motion system 204. The robot system 202 is configured to load and/or unload items to/from the motion system 204. The motion system 204 includes one or more movers 208. The robot system 202 includes a robot arm 203 to place items on or remove items from the one or more movers 208.

In some embodiments, the one or more movers 208 are motor-driven movers (e.g., linear motor driven motors) and movably mounted on a track 210 for moving along a path. It will be clear for a person of ordinary skill in the art to understand that the track 210 as shown in FIG. 2A is for illustrative purposes and any types of track can be used in the motion system 204. For example, the track 210 may be a linear planner track that provides a linear path for the movers to move along according to some embodiments. The track 210 may be a vertical track that enables the movers to move vertically (e.g., from a lower position to a higher position or vice versa) according to some other embodiments. In some embodiments, each of the one or more movers 208 includes at least one adhesive surface 209 that can provide reversible adhesion. In some embodiments, a reversible adhesive component that can provide reversible adhesion may be attached be the surface 209, such as the reversible adhesive apparatus described in U.S. patent application Ser. No. 17/350,455, "REVERSIBLE ADHESIVE APPARATUS," filed on Jun. 17, 2021, the content of which is hereby incorporated by reference in its entirety. For example, the reversible adhesive component may be a reversible adhesive apparatus that is designed with specific geometries to assist activating/deactivating adhesion by gravity induced shear forces and/or relative movement between the mover 208 and the item 206. In some other embodiments, the surface 209 may include a reversible adhesive layer that is made of reversible adhesive material.

Figure 2B:
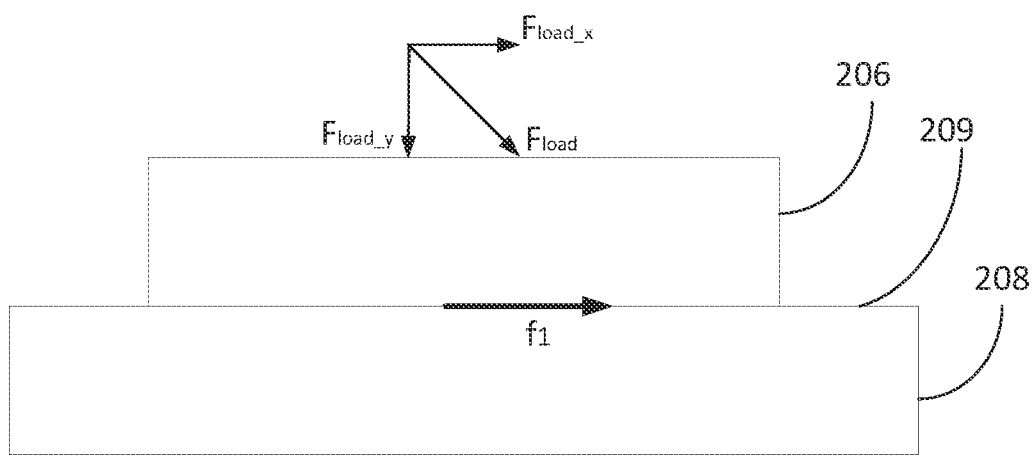
FIG. 2B shows activating reversible adhesion during a loading process of the track transportation system 200 according to an illustrative embodiment.

The robot system 202 is configured to generate a desired movement (e.g., a movement that generates a shear force between an item and a mover) while conducting a desired action (e.g., load or unload an item from a mover). As shown in FIG. 2B, the robot system 202 is configured to load the item 206 on the mover 208 and activate adhesion on the surface 209 of the mover 208. When the item 206 is being loaded on the mover 208, the robot system 202 applies a load force on the item 206. A vertical component $F_{load\_y}$ that is perpendicular to the surface 209 moves the item 206 on top of the surface 209. In some embodiments, when the $F_{unload\_y}$ is zero, gravity of the item 206 moves the item 206 on top of the surface 209. A horizontal component $F_{load\_x}$ that is parallel to the surface 209 generates a first relative movement (e.g., change of velocity, acceleration, etc.) between the item 206 and the mover 208 while the item 206 is being loaded, a friction force along the horizontal direction (or x direction) is generated to make the item 206 move along with the mover 208. The friction force generates a first shear force ($f_1$ as shown in FIG. 2B) between the item 206 and the mover 208 that activates adhesion on the surface 209 of the mover 208 so that the item 206 can be adhered to the surface 209 once the item 206 is loaded on the mover 208.

Figure 2C:
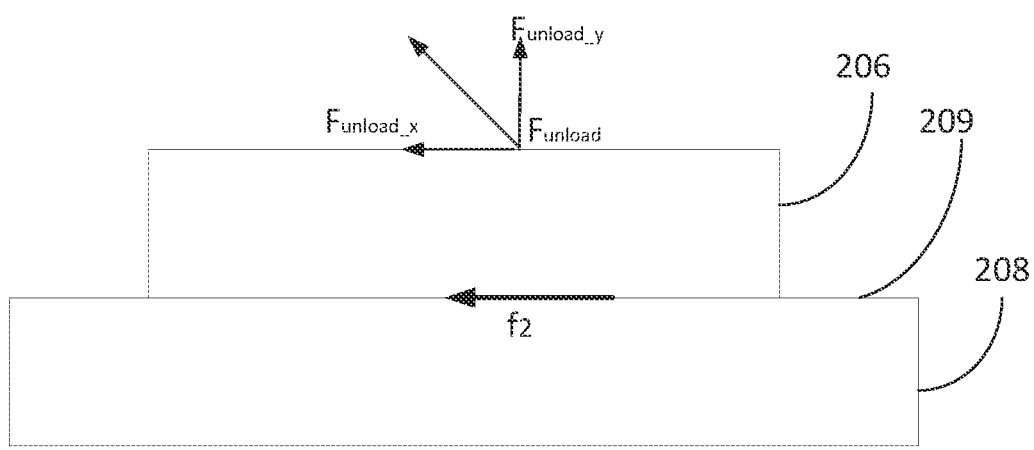
FIG. 2C shows deactivating reversible adhesion during an unloading process of the track transportation system 200 according to an illustrative embodiment.

As shown in FIG. 2C, the robot system 202 is configured to unload the item 206 from the mover 208 and deactivate adhesion on the surface 209 of the mover 208 by applying an unload force $F_{unload}$ on the item 206. The unload force has a $F_{unload\_y}$ component perpendicular to the contacting surface between the item 206 and the mover 208 to pull the item 206 from the mover 208. The unload force also has a $F_{unload\_x}$ component along the contacting surface between the item 206 and the mover 208 to stop the item 206 from moving along with the mover 208. The $F_{unload\_x}$ component is opposite to the moving direction. The $F_{unload\_x}$ component overcomes the friction force between the item 206 and the mover 208 and generates a second shear force $f_2$ between the item 206 and the mover 208. The second shear force $f_2$ deactivates adhesion on the surface 209 of the mover 208 so that the item 206 can be removed from the surface 209 to be unloaded from the mover 208. In some embodiments, the second shear force $f_2$ has a direction that is opposite to the first shear force $f_1$.

Figure 3:
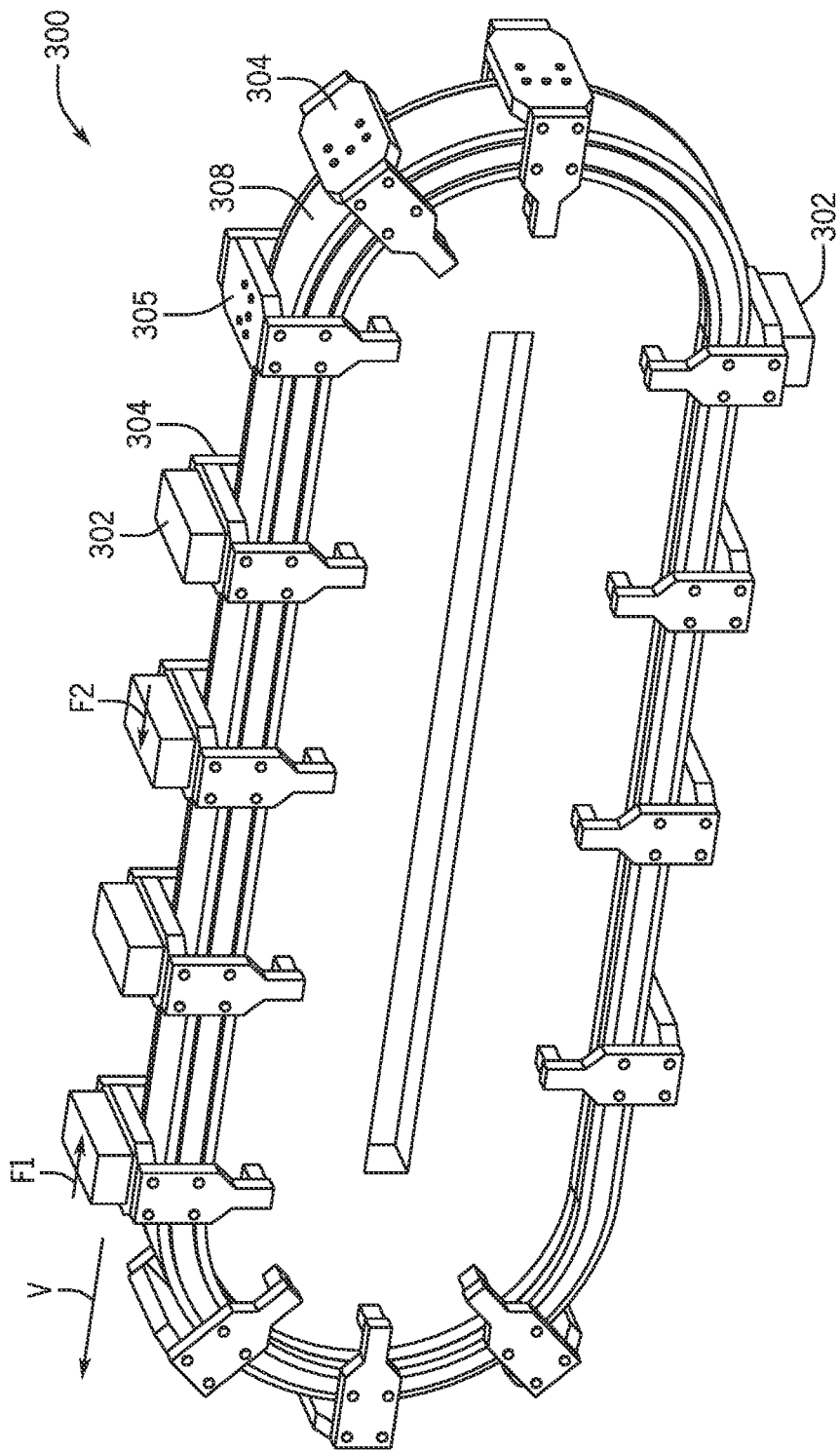
FIG. 3 shows a motion system 300 according to an illustrative embodiment.

FIG. 3 shows a motion system 300 according to an illustrative embodiment. The motion system 300 is configured to receive loaded items 302, move the items 302 to desired locations, and unload the items 302. The motion system 300 includes one or more movers 304. In some embodiments, the one or more movers 304 are motor-driven movers (e.g., linear motor driven motors) and movably mounted on a track 308 for moving along a path. It will be clear for a person of ordinary skill in the art to understand that the track 308 as shown in FIG. 3 is for illustrative purposes and any types of track can be used in the motion system 300. For example, the track 308 may be a linear planner track that provides a linear path for the movers to move along according to some embodiments. The track 308 may be a vertical track that enables the movers to move vertically (e.g., from a lower position to a higher position or vice versa) according to some other embodiments. In some embodiments, each of the one or more movers 304 includes at least one adhesive surface 305 that can provide reversible adhesion. In some embodiments, a reversible adhesive component that can provide reversible adhesion may be attached to the surface 305, such as the reversible adhesive apparatus described in U.S. patent application Ser. No. 17/350,455, "REVERSIBLE ADHESIVE APPARATUS," filed on Jun. 17, 2021, the content of which is hereby incorporated by reference in its entirety. In some other embodiments, the surface 305 may include a reversible adhesive layer that is made of reversible adhesive material.

In some embodiments, each of the movers 304 moves and is controlled independently. In some embodiments, each of the movers 304 is configured to activate or deactivate adhesions by generating shear forces. For example, the mover 304 is configured to generate a first shear force $f_1$ between the surface 305 and the item 302, while the item 302 is being loaded to the mover 304, to activate adhesion and generate a second shear force $f_2$ between the surface 305 and the item 302, while the item 302 is being unloaded from the mover 304, to deactivate the adhesion. The first shear force is different from the second shear force. In some embodiments, the first and the second shear forces are generated by changing one or more parameters of the mover 304 such as position, speed, acceleration, etc. In some other embodiments, each mover 304 includes an actuator (not shown) and the first and the second shear forces are generated by the actuator. The actuator may include any suitable mechanical or electrical actuators. For example, a mechanical lever pushes the item 302 while the item 302 is being loaded on the mover 304 such that a shear force between the item 302 and the mover 304 is generated to activate adhesion between the item 302 and the mover 304. As another example, an electrical actuator may be configured to generate a shear force between the item 302 and the mover 304 while the item 304 is being loaded on the mover 304 such that the generated shear force activates adhesion of the surface 305 of the mover 304.

Figure 4:
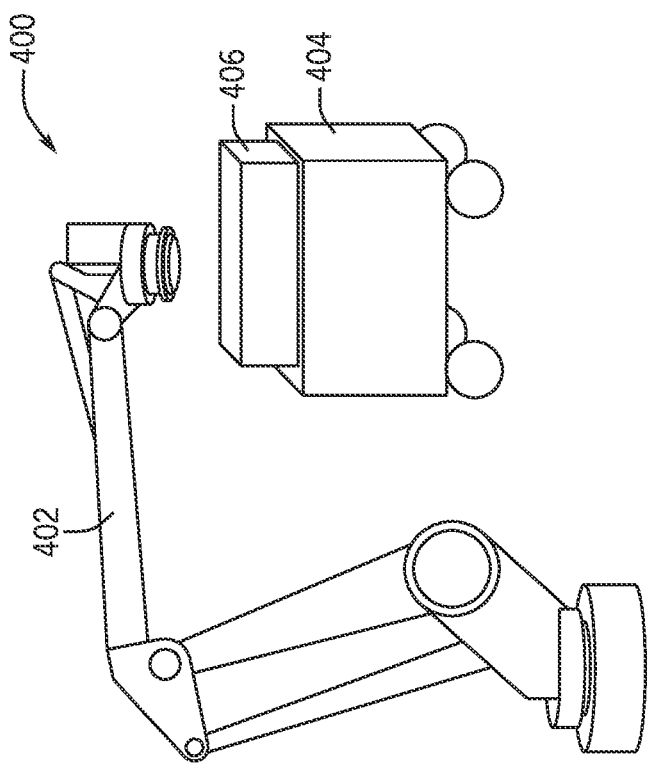
FIG. 4 shows a mobile transportation system 400 according to an illustrative embodiment.
Figure 4:
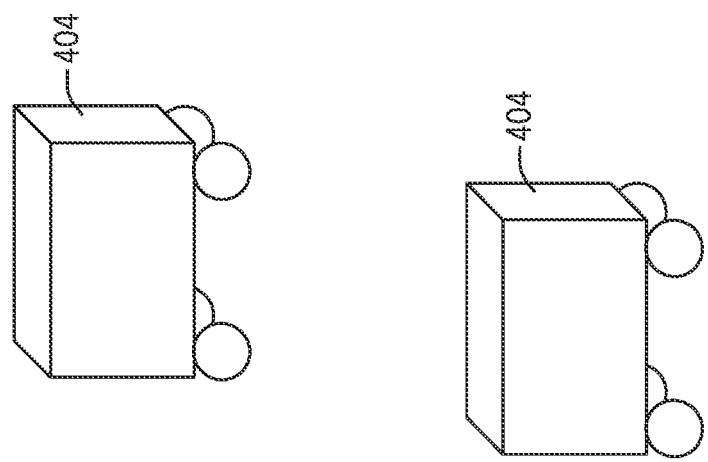

FIG. 4 shows a mobile transportation system 400 according to an illustrative embodiment. The mobile transportation system 400 may be used to transport various components (e.g., item 406) in an industrial automation environment. For example, the mobile transportation system 400 can be used in a consumer packaged goods system. The mobile transportation system 400 includes a control system (not shown), a robot system 402, and a motion system. The robot system 402 is configured to load and/or unload items to/from the motion system. The motion system includes one or more industrial mobile robotic movers 404. The industrial mobile robotic movers 404 include, but are not limited to, autonomous guided robots configured to move in fixed paths and autonomous mobile robots configured to navigate their own paths. In some embodiments, each of the one or more industrial mobile robotic movers 404 includes at least one adhesive surface that can provide reversible adhesion. In some embodiments, each of the one or more industrial mobile robotic movers 404 has at least one surface to which a reversible adhesive component is attached. The reversible adhesive component can provide reversible adhesion, such as the reversible adhesive apparatus described in U.S. patent application Ser. No. 17/350,455, "REVERSIBLE ADHESIVE APPARATUS," filed on Jun. 17, 2021, the content of which is hereby incorporated by reference in its entirety. For example, each mover 404 has a reversible adhesive component attached on the top surface of the mover to receive item.

In some embodiments, each of the one or more industrial mobile robotic movers 404 may include an actuator (not shown) configured to activate and/or deactivate reversible adhesion on the mover 404. In some embodiments, the reversible adhesion is activated in response to a first shear force being generated between the contacting surfaces of the mover 404 and the item 406. In some embodiments, the reversible adhesion is deactivated in response to a second shear force being generated between the contacting surfaces of the mover 404 and the item 406. The actuator may include any suitable mechanical or electrical actuators. For example, a mechanical lever may push the item 406 while it is being loaded on the mover 404 such that a shear force between the item 406 and the mover 404 is created to activate adhesion. As another example, an electrical actuator may be configured to generate a shear force between the item 406 and the mover 404 while the item 406 is being loaded on the mover 404 such that the generated shear force activates adhesion of the mover 404.

In some embodiments, the control system is configured to control the robot system 402 and the one or more industrial mobile robotic movers 404. For example, the control system 102 may send control signals to the robot system 402 and instruct the robot system 402 to generate a desired movement (e.g., a movement that generates a shear force between an item and a mover) and conduct a desired action (e.g., load or unload an item on or from a mover). The control system may send control signals to control one or more parameters of the one or more industrial mobile robotic movers 404, such as position, velocity, acceleration, jerk, force, current, etc.

The control system is configured to generate control signals to activate and/or deactivate adhesion between items and the one or more movers 404 by controlling at least one of the robot system 402 and the motion system. The control system is configured to control activation and deactivation of the reversible adhesion at any desired time and/or in any desire mover position.

For example, in some embodiments, the control system sends first control signals to the robot system 402 to load the item in a way such that loading action can generate a first shear force between the item 406 and the mover 404 to activate adhesion. The loading action may generate a first relative movement (e.g., change of velocity, acceleration, etc.) between the item and mover 208 while the item is being loaded. The first relative movement generates a friction force along a horizontal direction (or x direction) to make the item move along with the mover. The friction force further generates the first shear force between the item and the mover that activates adhesion on the mover so that the item can be adhered to the mover.

In some embodiments, the control system sends second control signals to the robot system to unload the item 406 in a way such that the unloading action can generate a second shear force between the item 406 and the mover 404 to deactivate adhesion. The unloading action may apply an unload force on the item. The unload force has a vertical component perpendicular to the contacting surface between the item and the mover to pull the item from the mover. The unload force also has a horizontal component along the contacting surface between the item and the mover to stop the item from moving along with the mover. The horizontal component is opposite to the moving direction. The horizontal component overcomes the friction force between the item and the mover and generates a second shear force between the item and the mover. The second shear force deactivates adhesion on the mover so that the item can be removed from the mover. In some embodiments, the second shear force has a direction that is opposite to the first shear force. For example, the control system may receive a first instruction from a user or a program to load an item on a respective mover at a first location and a second instruction from the user or the program to unload the item from the respective mover at a second location. The control system may generate first control signals for the robot system, according to the first instruction, to load the item on each mover at the first location and activate adhesion on the mover to adhere the item at loading. The control system may generate second control signals for the robot system, according to the second instruction, to unload the item from the respective mover at the second location and deactivate adhesion on the mover to release the item at unloading.

In some embodiments, the control system sends first control signals to the motion system to generate, while the item 406 is being loaded to the mover 404, a first shear force between the item and the mover to activate adhesion. In some embodiments, the control system sends second control signals to the motion system to generate, while the item 406 is being unloaded from the mover 404, a second shear force between the item 406 and mover 404 to deactivate adhesion. In some embodiments, the first and second control signals may change any suitable parameters (e.g., velocity, acceleration, etc.) of the mover such that first and second shear force may be generated. For example, the control system may receive a first instruction from a user or a program to load an item on a respective mover at a first location and a second instruction from the user or the program to unload the item from the respective mover at a second location. The control system may generate first control signals for the motion system, according to the first instruction, to move each mover to a first location for receiving the item and generate a first relative movement between the item and mover to activate adhesion on the mover to adhere the item at loading. The control system may generate second control signals for the motion system, according to the second instruction, to move each mover to a second location for unloading the item and generate a second relative movement between the item and the mover to deactivate adhesion on the mover to release the item at unloading.

In some embodiments, the control system may send first control signals to at least one of the robot system and the motion system to activate adhesion and sends second control signals to at least one of the robot system and the motion system to deactivate adhesion. For example, the control system may instruct, through the first control signals while loading an item 406, the robot system to generate a first shear force between the item and the mover 404 to activate adhesion and instruct, through the second control signals while unloading the item 406, the motion system to generate a second shear force between item 406 and the mover 404 to deactivate adhesion.

Figure 5:
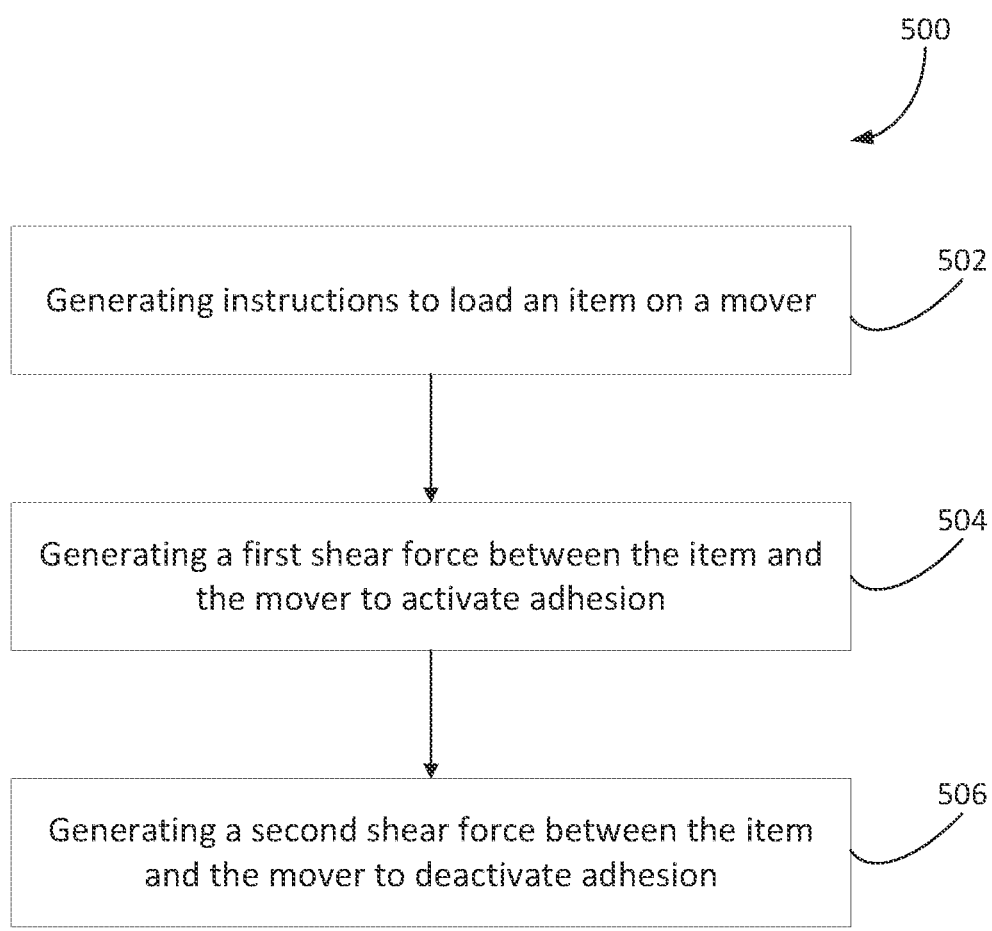
FIG. 5 shows a flow diagram of a transportation process 500 according to an illustrative embodiment.

FIG. 5 is a flow diagram of a transportation process 500 according to an illustrative embodiment. At operation 502, a control system of an industrial automation system generates instructions for a robot to load an item on a mover. The mover can be any suitable mover in an industrial automation system that can be controlled for transporting items. For example, the mover can be any mover as described in this disclosure. The mover includes a surface that can provide reversible adhesion. The reversible adhesion can be activated and deactivated by applying different shear forces (e.g., shear force with different angles.)

At operation 504, the control system instructs at least one of the robot and the mover to generate a first shear force between the item and the mover to activate adhesion. In some embodiments, the first shear force may be generated by changing one or more parameters of the mover such as a velocity, an acceleration, etc. In some embodiments, the first shear force may be generated by changing one or more parameters of the robot such as a velocity, and acceleration, etc. In some embodiments, the mover includes an actuator that receives the instructions from the control system and is configured to generate the first shear force.

At operation 506, the control system instructs at least one of the robot and the mover to generate a second shear force between the item and the mover to deactivate adhesion. In some embodiments, the second shear force may be generated by changing one or more parameters of the mover such as a velocity, an acceleration, etc. In some embodiments, the second shear force may be generated by changing one or more parameters of the robot such as a velocity, and acceleration, etc. In some embodiments, the mover includes an actuator that receives the instructions from the control system and is configured to generate the second shear force.

The subject matter as described above includes various exemplary aspects. However, it should be appreciated that it is not possible to describe every conceivable component or methodology for purposes of describing these aspects. One of ordinary skill in the art can recognize that further combinations or permutations can be possible. Various methodologies or architectures can be employed to implement the various embodiments, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

It should be noted that certain passages of this disclosure can reference terms such as "top" and "bottom" in connection with side and surface, etc., for purposes of identifying or differentiating one from another or from others. These terms are not intended to merely relate entities (e.g., top surface and bottom surface) temporally or according to an orientation, although in some cases, these entities can include such a relationship. Nor do these terms limit the number of possible entities (e.g., surfaces) that can operate within a system or environment.

What is claimed is:

1. An industrial transportation system, comprising:
   a control system;
   one or more movers that each move independently in response to mover control signals output by said control system, each of the movers comprising a reversible adhesion surface that provides reversible adhesion; and
   a robot system configured to load one or more associated items on the reversible adhesion surface of respective movers and unload the one or more associated items from the reversible adhesion surface of respective movers in response to robot control signals output by said control system,
   wherein: (i) the reversible adhesion of the reversible adhesion surface is activated during loading of the one or more associated items onto the reversible adhesion surface by the robot system by a first shear force acting between the one or more associated items and the reversible adhesion surface of the mover; and (ii) the reversible adhesion of the reversible adhesion surface is deactivated during unloading of the one or more associated items from the reversible adhesion surface by the robot system by a second shear force acting between the one or more associated items and the reversible adhesion surface of the mover;
   said first shear force generated parallel to the reversible adhesion surface in a first direction in response to said control system outputting said mover control signals and said robot control signals to induce relative movement between the one or more associated items and the reversible adhesion surface of the mover to overcome a first friction force between the one or more associated items and the reversible adhesion surface;
   said second shear force generated parallel to the reversible adhesion surface in a second direction that is opposite the first direction in response to said control system outputting said mover control signals and said robot control signals to induce relative movement between the one or more associated items and the reversible adhesion surface of the mover to overcome a second friction force between the one or more associated items and the reversible adhesion surface.

2. The industrial transportation system of claim 1, wherein the one or more movers comprises one or more linear motor driven movers.

3. The industrial transportation system of claim 2, further comprising a track, wherein each of the one or more movers is movably mounted on the track and is configured to move along the track independently.

4. The industrial transportation system of claim 1, wherein the one or more movers comprise at least one autonomous guided robot configured to move in a fixed path.

5. The industrial transportation system of claim 1, wherein the one or more movers comprise at least one autonomous mobile robot configured to navigate its own path.

6. The industrial transportation system of claim 1, wherein the first shear force and the second shear force are generated by the control system outputting mover control signals for changing one or more parameters of the mover, wherein the parameters comprise: (i) position of the mover relative to the robot system, (ii) velocity relative to the robot system, and (iii) acceleration of the mover relative to the robot system.

7. The industrial transportation system of claim 6, wherein the one or more movers each further comprise a mechanical actuator configured to generate the first shear force and the second shear force by physically contacting and moving the one or more associated items on the reversible adhesion surface.

8. The industrial transportation system of claim 1, wherein the first shear force and the second shear force are generated by the control system outputting robot control signals to the robot system for generating a relative movement between the one or more associated items on the reversible adhesion surface and the reversible adhesion surface of the mover.

9. The industrial transportation system of claim 1, wherein at least one of the one or more movers comprises a second surface configured to provide reversible adhesion between the mover and an adjacent mover for selective interconnection of the mover and the adjacent mover.

* * * * *